United States Patent [19]

Fehlmann

[11] 4,313,373
[45] Feb. 2, 1982

[54] APPARATUS FOR PITTING DATES OR THE LIKE

[75] Inventor: Viktor Fehlmann, Möriken, Switzerland

[73] Assignee: Ferrum AG, Rupperswil, Switzerland

[21] Appl. No.: 190,360

[22] Filed: Sep. 24, 1980

Related U.S. Application Data

[63] Continuation of Ser. No. 115,879, Jan. 28, 1980, abandoned, which is a continuation of Ser. No. 933,825, Aug. 15, 1978, abandoned.

[30] Foreign Application Priority Data

Aug. 8, 1977 [CH] Switzerland ............ 10128/77

[51] Int. Cl.$^3$ ................................. A23N 4/08
[52] U.S. Cl. ........................... 99/549; 99/560; 99/565; 198/384
[58] Field of Search .......... 99/547, 549, 557, 559–561, 99/565; 198/384

[56] References Cited

U.S. PATENT DOCUMENTS

| | | | |
|---|---|---|---|
| 3,061,070 | 10/1962 | Smith | 198/384 |
| 3,153,473 | 10/1964 | Margaroli | 198/384 |
| 3,273,615 | 9/1966 | Aguilar | 99/561 |
| 3,277,940 | 10/1966 | Henderson et al. | 99/561 |
| 3,282,396 | 11/1966 | Tomelleri | 198/384 |
| 4,103,607 | 8/1978 | Hansen et al. | 99/561 |

Primary Examiner—Philip R. Coe
Assistant Examiner—Timothy F. Simone
Attorney, Agent, or Firm—Peter K. Kontler

[57] ABSTRACT

Apparatus for pitting dates wherein an endless apron consisting of plates with sockets for dates is transported stepwise by two chains past a hopper which dispenses randomly distributed dates onto the upper sides of successive plates, past an adjustable elastic refuser which intercepts overlapping dates and directs some intercepted dates into empty sockets, past a rotary brush which inclines partly inserted dates in a direction counter to the direction of movement of the plates, past a centering station wherein semicylindrical extensions of tubular centering elements penetrate into the sockets of the adjacent plate to promote or cause complete penetration of partly inserted dates into the respective sockets, and thereupon past a removing station where the cutting edges at the leading ends of reciprocable tools penetrate into the sockets to expel pits from the dates. A first nozzle sprays water onto the leading ends of pit removing tools while the leading ends extend beyond the sockets of the plate at the removing station, a second nozzle sprays water onto the outer sides of successive plates and the surfaces bounding the sockets of such plates ahead of the hopper, and a third nozzle intermittently discharges sprays of water against the inner sides of successive plates to remove sugar from the plates, when necessary.

10 Claims, 6 Drawing Figures

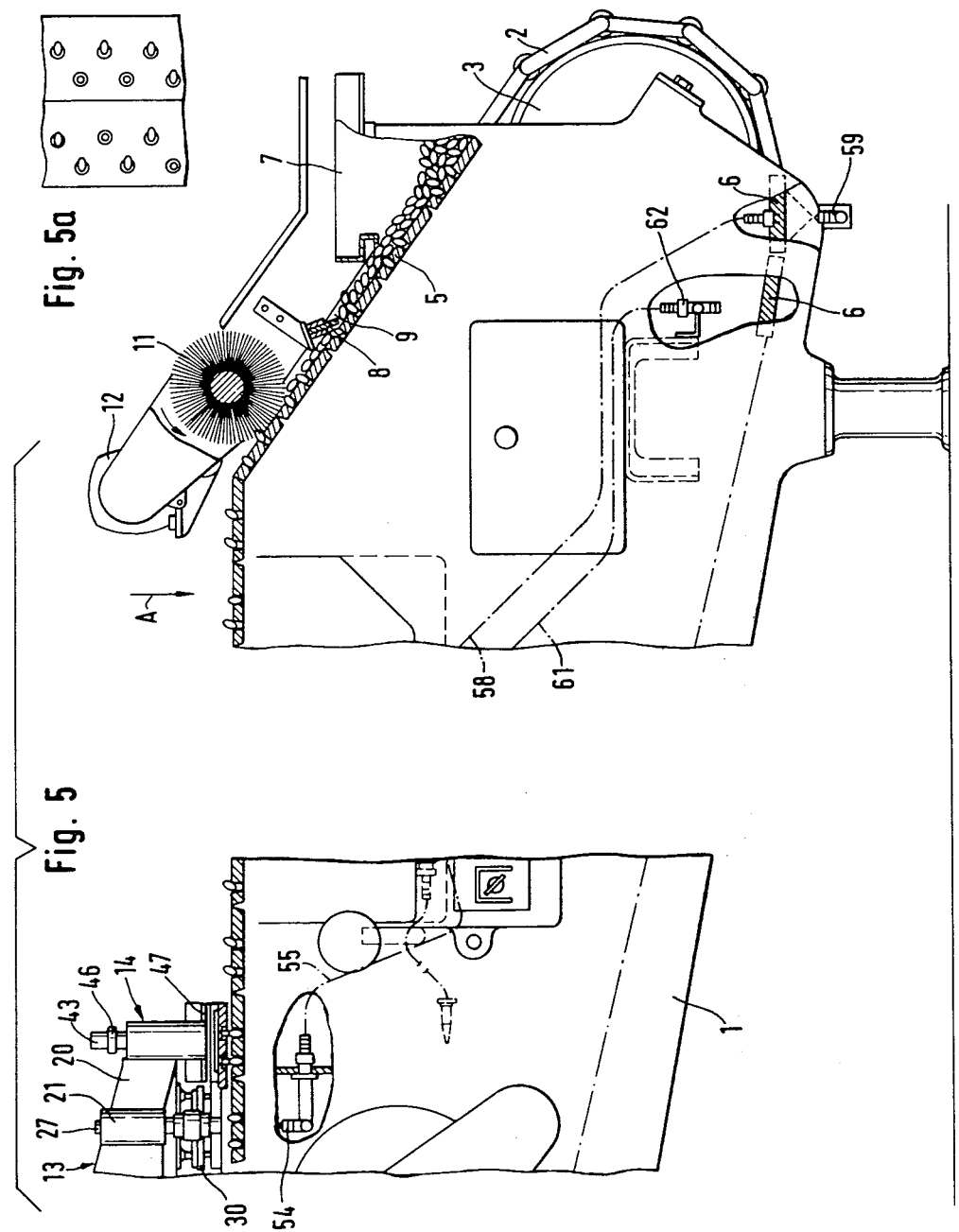

APPARATUS FOR PITTING DATES OR THE LIKE

CROSS-REFERENCE TO RELATED CASES

This is a Rule 1.60 continuation application of the commonly owned copending application Ser. No. 115,879, filed Jan. 28, 1980 and now abandoned. The application Ser. No. 115,879 is a Rule 1.60 continuation application of the commonly owned application Ser. No. 933,825, filed Aug. 15, 1978 and now abandoned.

BACKGROUND OF THE INVENTION

The present invention relates to apparatus for removing pits, seeds or stones from drupaceous fruits, especially from dates. More particularly, the invention relates to improvements in pitting apparatus of the type wherein supporting elements with sockets for fruits to be pitted are movable into register with mobile pit removing tools.

Pitting apparatus of the above outlined character are used to remove stones, pits or seeds (hereinafter called pits for short) from various drupaceous fruits including cherries, apricots, peaches, all types of plums (including reine-claudes and mirabelles) and others. However, such apparatus are not suited for large-scale pitting of elongated slender and strongly adherent fruits, especially dates. Problems which arise in connection with the pitting of dates are attributable to many factors. Thus, it is rather difficult to introduce a slender tacky date into an elongated socket of the supporting element and the sugary coating of the date rapidly contaminates the surface surrounding the socket as well as the side of the supporting element at which the date is introduced into the socket. The same holds true for the pit removing tools, i.e., the tools are rapidly coated with concentrated sugar. Therefore, the apparatus must be arrested at frequent intervals for the purpose of removing sugary coats from the supporting elements as well as from the tools.

OBJECTS AND SUMMARY OF THE INVENTION

An object of the invention is to provide a novel and improved apparatus which can remove pits from a variety of drupaceous fruits includng dates and like fruits which exhibit a strong tendency to adhere to component parts of the pitting apparatus.

Another object of the invention is to provide an apparatus which can remove pits from large quantities of fruits per unit of time, which can reliably remove pits from each and every fruit at the pit removing station, and which requires a minimum of maintenance, even if the fruits to be pitted are dates or like drupaceous fruits which exhibit a pronounced tendency to adhere to each and every part that comes in contact therewith.

A further object of the invention is to provide the apparatus with novel and improved means for orienting dates or like fruits prior to arrival at the pit removing station.

An additional object of the invention is to provide the apparatus with novel and improved means for introducing dates into and for centering dates in the sockets of supporting elements which transport dates into register with the pit removing instrumentalities.

Another object of the invention is to provide the apparatus with novel means for conditioning the supporting elements. during transport to the fruit receiving station.

An additional object of the invention is to provide the apparatus with novel and improved means for preventing adherence of juices, sugar and other ingredients of fruits to the pit removing instrumentalities and/or to the fruit supporting elements.

Another object of the invention is to provide the apparatus with novel and improved means for promoting the introduction of dates or the like into the sockets of supporting elements.

The invention is embodied in an apparatus for pitting drupaceous fruits, especially dates and similar elongated fruits which tend to adhere to component parts of the pitting apparatus. The apparatus comprises a series of preferably plate-like supporting elements having sockets for reception of fruits, a pair of intermittently driven chains or analogous means for transporting the supporting elements seriatim along a predetermined path (preferably along an endless path) to a first station where the fruits are admitted into at least some sockets of successive supporting elements whereby at least some of the admitted fruits are normally received only in part in the respective sockets (i.e., one end portion or even the major portion of one or more fruits will extend from the respective socket), thereupon to a second station (which can be called a centering or final orienting station) and then to a third station (namely, a pit removing station), means for centering those fruits which are partly received in the respective sockets of the supporting element at the second station (the centering means preferably includes a tubular centering element for each and every socket of a supporting element), and means for removing pits from fruits in the sockets of the supporting element at the third station (such removing means preferably comprises a discrete reciprocable tool for each socket of a supporting element and a holder or analogous means for moving the tools into, through and partly beyond the registering sockets of the supporting element at the third station).

Certain other features of the apparatus reside in the provision of a rotary brush or analogous orientating means which is adjacent to the aforementioned path between the first and second stations and whose bristles incline the partly received fruits in a predetermined direction, in the provision of a preferably elastic refuser which extends transversely of the path between the orienting brush and the first station (the first station preferably accommodates a magazine or hopper serving to dispense fruits against one side of that supporting element which is located at the first station), in the provision of one or more nozzles which apply liquid films to the end portions of tools upon partial movement of the tools beyond the sockets of the supporting element at the third station, in the provision of means for applying liquid films to surfaces bounding the sockets of successive supporting elements ahead of the first station, and in the provision of means for applying liquid films to those sides of the supporting elements which face away from the magazine during travel through and/or during dwell at the first station.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific em-

BRIEF DESCRIPTION OF THE DRAWING

FIG. 5 is an enlarged partly elevational and partly longitudinal vertical sectional view of the apparatus which is shown in FIG. 1; and FIG. 5a is a plan view of portions of two neighboring supporting elements as seen in the direction of arrow A in FIG. 5.

DESCRIPTION OF THE PREFERRED EMBODIMENTS

Figure 1:
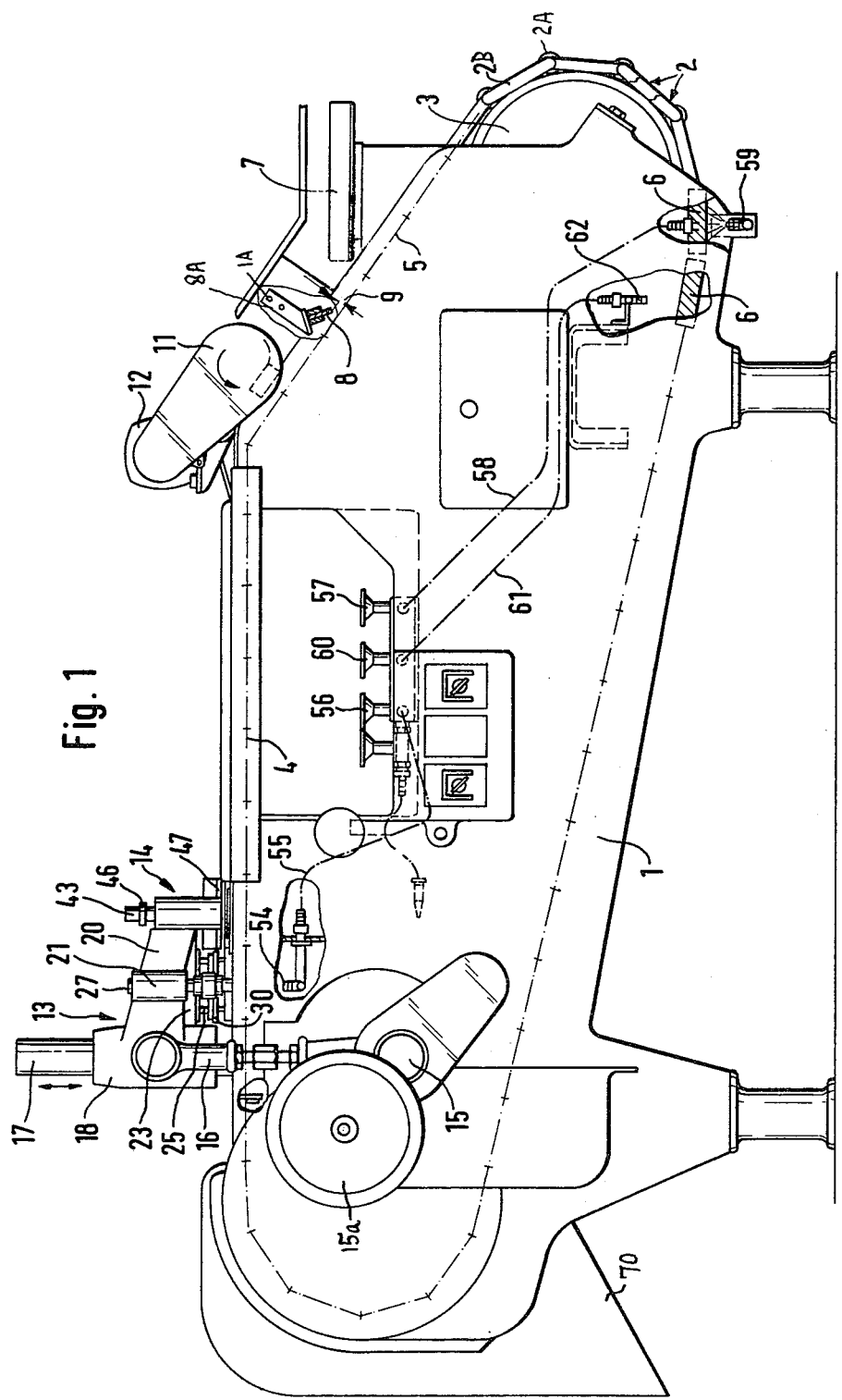
FIG. 1 is a somewhat schematic elevational view of a pitting apparatus which embodies the invention.

FIG. 1 illustrates a pitting apparatus including a frame or housing 1, certain portions of which are shown in section. The apparatus comprising two endless transporting chains 2 with rollers 2A between neighboring links 2B. The chains 2 are disposed in two parallel vertical planes and are trained over sprocket wheels 3, one of which is shown in the right-hand portion of FIG. 1. The distribution of sprocket wheels 3 in the frame 1 is such that each chain 2 includes a substantially horizontal upper reach or stretch 4 and an upwardly sloping reach 5 located immediately ahead of the reach 4, as considered in the direction of movement of the chains. One set of sprocket wheels 3 is driven by a suitable prime mover (e.g., a variable-speed electric motor, not shown) through the medium of a geneva drive or other known means for imparting to the chains an intermittent movement through increments of predetermined length.

The links 2B of the two chains 2 carry a series of plate-like supporting elements 6 which are provided with sockets 10 (FIG. 2) for the fruits to be pitted. The invention will be described with reference to the pitting of dates; however, it will be readily understood that the apparatus can be used with equal advantage for pitting of other types of drupaceous fruits at least the majority of which are easier to handle than dates.

The means for dispensing dates into the sockets 10 of successive supporting elements 6 (hereinafter called plates for shot) comprises a magazine or hopper 7 which is located above the plates 6 traveling with the upwardly sloping reaches 5 of the chains 2. The hopper 7 can receive dates continuously or in batches, and the dates can be fed by hand or by a suitable conveyor system or metering system of any known design.

The hopper 7 is followed by a refuser 8 which is an elastic strip extending transversely of and slightly above the exposed upper sides of plates 6 which advance beyond the hopper. The end portions of the refuser 8 are secured to holders 8A which are adjustably mounted in the frame 1 so that the distance 9 between the free edge portion of the refuser 8 and the upper side of the adjacent plate 6 can be varied within a desired range. The exact manner in which the holders 8A are adjustably secured to the frame 1 forms no part of the invention. For example, the holder 8A can be formed with elongated slots for screws or bolts 1A which mesh with the adjacent portions of the frame 1.

Figure 2:
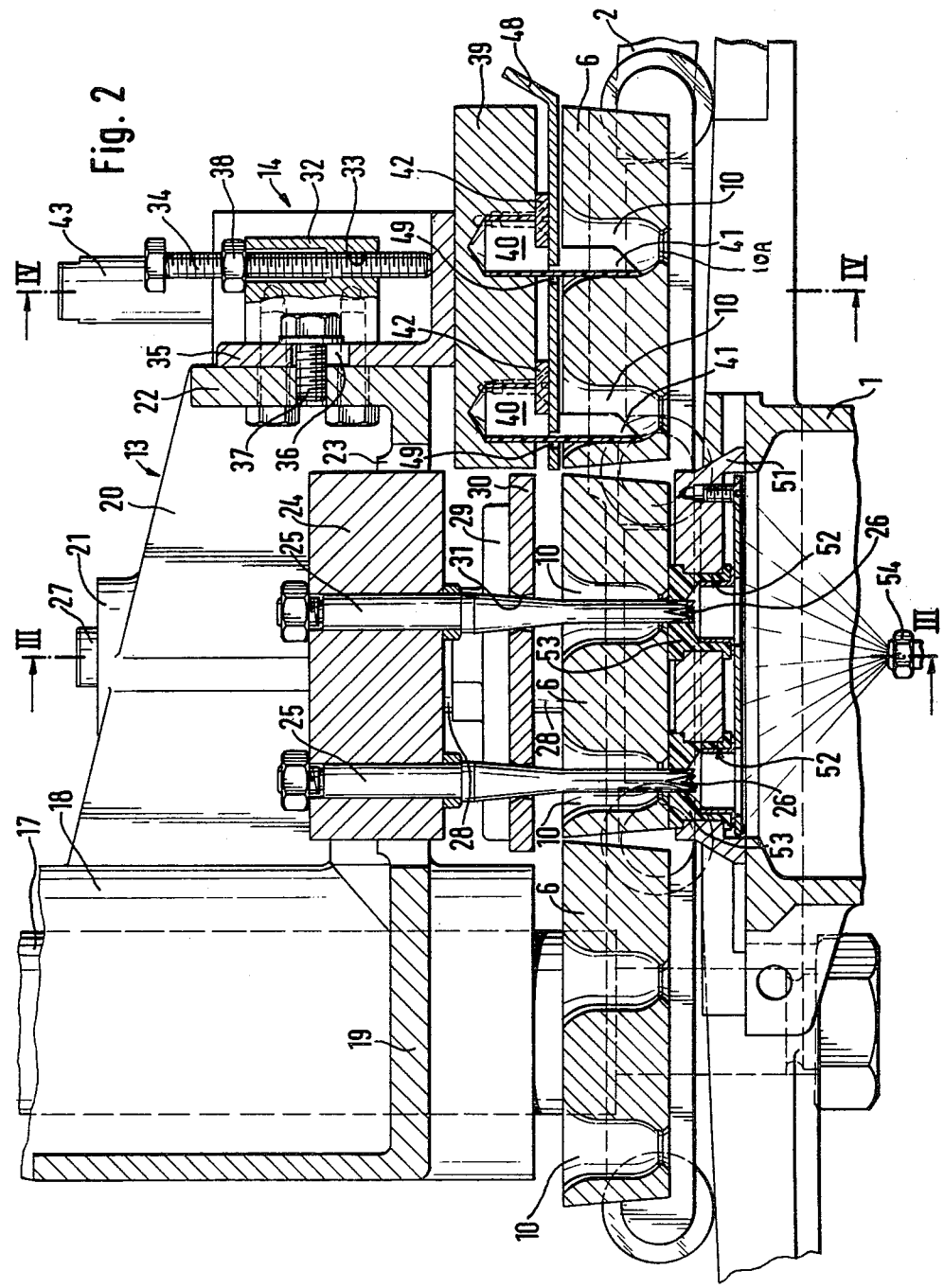
FIG. 2 is an enlarged longitudinal vertical sectional view of that portion of the apparatus which includes the centering and pit removing stations.

Each socket 10 is actually a hole which extends through the entire plate 6. However, and as shown in FIG. 2, the lowermost portion of each socket 10 (the term "lowermost" is used with reference to the sockets 10 of those plates 6 which travel with the horizontal reaches 4 of the chains 2) is a relatively narrow passage 10A which does not permit a properly inserted date to fall therethrough. The surface bounding the upper portions of the sockets are tulip-shaped, i.e., they have maximum diameters at the upper side of the respective plate 6, and the diameters of such surfaces thereupon gradually decreases, remain constant and decrease again to merge into the surfaces bounding the aforementioned passages 10A. The sockets 10 are relatively long, as considered at right angles to the planes of the outer sides of the respective plates 6, so that each thereof can maintain a properly inserted date in upright position during travel toward and below the pit removing station 13.

The refuser 8 serves to remove excessive accumulations of concentrated sugar at the exposed sides of the plates 6. In other words, the refuser 8 equalizes such accumulations so that a plate 6 which advances beyond the refuser carries a relatively thin layer of sugar which can be removed by the bristles (see FIG. 5a) of a rotary oreinting brush 11 mounted downstream of the refuser 8, preferably still adjacent to the ascending or upwardly sloping reaches 5 of the chains 2. The refuser 8 further promotes entry of dates into the adjacent sockets 10 as well as deeper penetration of partially inserted dates into the respective sockets. The elasticity of the refuser 8 is sufficiently high to insure that it does not unduly deform or squash a date which does not extend into one of the sockets 10. As a rule, the exposed part of the refuser will form a yieldable barrier or gate which accumulates a supply of dates adjacent to its right-hand side, as viewed in FIG. 1, and invariably induces at least some dates of such supply to enter an oncoming socket 10 when the chains 2 are in motion. The dates which rest on the plates 6 between neighboring sockets 10 can deflect the refuser 8 and advance into the range of orbiting bristles on the rapidly rotating brush 11. The bristles propel such dates back into the hopper 7. It will be noted that the brush 11 rotates in a counterclockwise direction, as viewed in FIG. 1, so that it sweeps the oncoming (non-inserted) dates back toward the upper end of the hopper 7. At the same time, the bristles of the brush 11 remove at least some of the aforementioned sugar layer which is left at the exposed sides of the plates 6 owing to the presence of the gap 9 between the free edge portion of the refuser 8 and the upper or outer side of the adjacent plate 6.

The bristles of the brush 11 further change or tend to change the orientation of dates which are partially received in their respective sockets 10. Partially introduced dates are oriented in such a way that their exposed (upper) parts slope rearwardly, i.e., counter to the direction of travel of the chains 2. Otherwise stated, the longitudinal directions of partly inserted dates which are not swept away by the bristles of the brush 11 are located in or close to planes which are parallel to the planes of the chains. In many instances, partially inserted dates are nearly parallel to the upper sides of the respective plates 6. At any rate, by looking from above at a plate 6 which has advanced beyond the brush 11 (see FIG. 5a), one can see dates which are fully inserted as well as partially inserted dates all of which are substantially parallel to the longitudinal directions of the upper reaches 4 of the chains 2.

The brush 11 is driven by a motor 12 whose housing is mounted on the frame 1.

The partially and fully inserted dates which advance beyond the brush 11 are moved stepwise toward the pit removing station 13 which, in the illustrated embodiment, is adjacent to the left-hand end portions of upper reaches 4 of the chains 2, as viewed in FIG. 1. The pit removing station 13 is preceded by a centering or final orienting station 14 at which the partly inserted dates are caused to assume optimum positions with respect to pit removing instrumentalities 25 at the station 13, i.e., each partly inserted date is caused to penetrate deeper into the respective socket 10 so that its pit can be expelled in predictable fashion.

Figure 3:
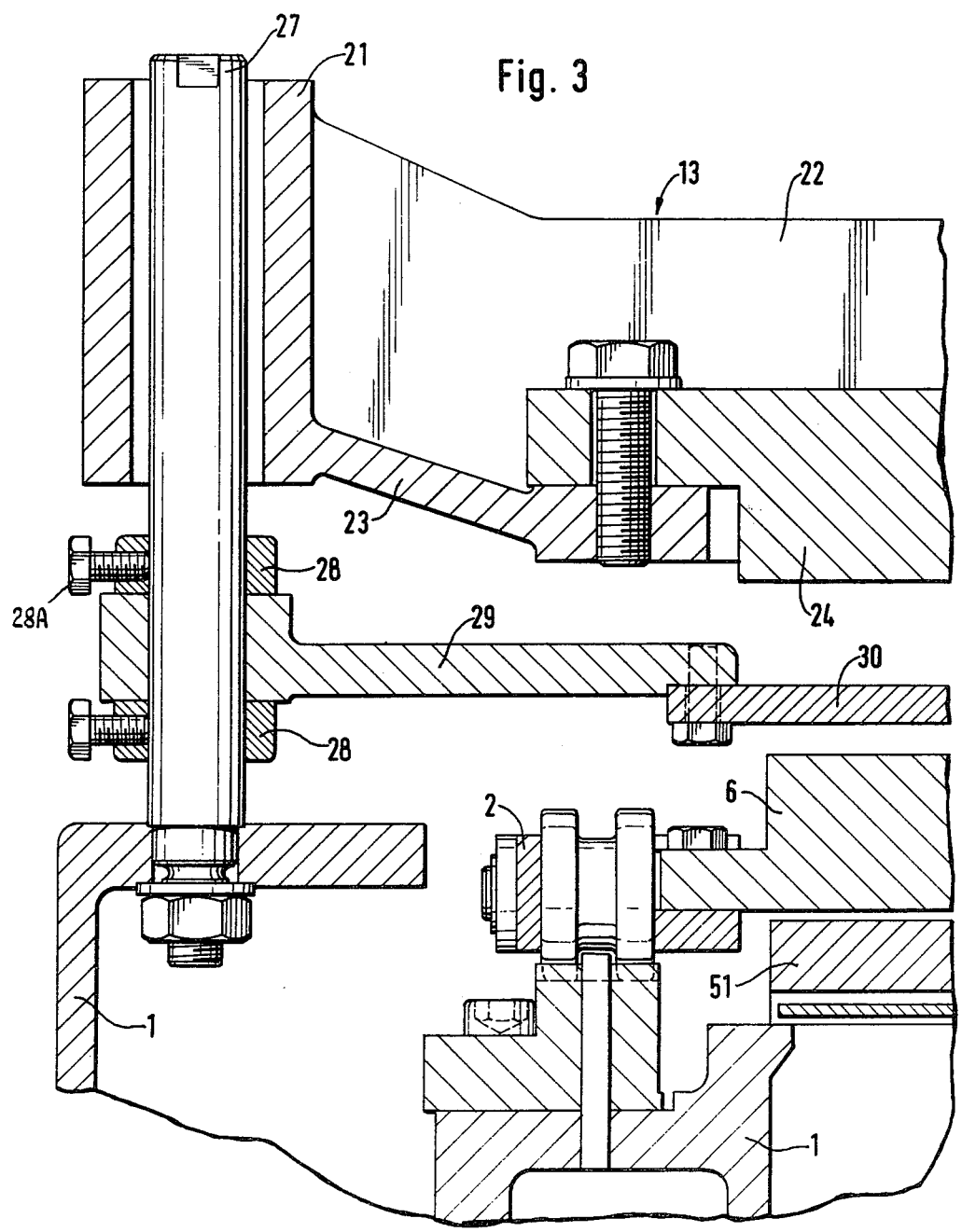
FIG. 3 is a transverse vertical sectional view as seen in the direction of arrows from the line III—III of FIG. 2.
Figure 4:
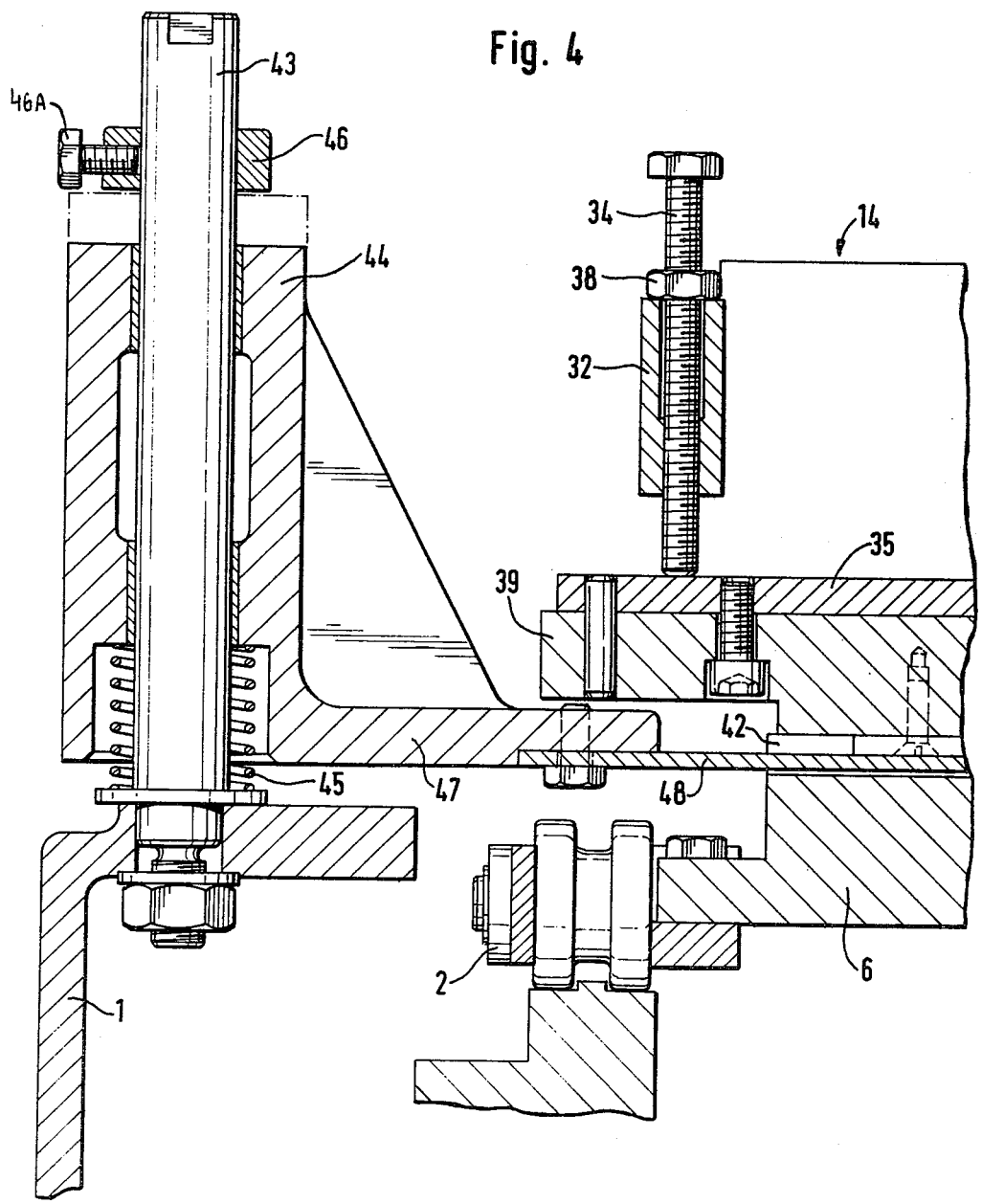
FIG. 4 is a transverse vertical sectional view as seen in the direction of arrows from the line IV—IV of FIG. 2.

The details of the pit removing unit at the station 13 and of the centering or final orienting unit at the station 14 are shown in FIGS. 2, 3 and 4. The pit removing unit comprises a movable section which is caused to travel up and down in response to rotation of a crank shaft 15 which drives two connecting rods 16 so that the connecting rods move up and down, as viewed in FIG. 1. These connecting rods are disposed at the opposite sides of the endless apron consisting of plates 6. The aforementioned movable section of the pit removing unit comprises two sleeves 18 which are reciprocable along two vertical columns or guides 17 and each of which is articulately coupled to the upper end portion of the respective connecting rod 16. A plate 6 moves into register with the movable section of the pit removing unit during each indexing movement of the chains 2. The chains 2 are thereupon held at a standstill during expulsion of pits and are set in motion again to advance a plate 6 with freshly pitted dates in its sockets 10 beyond the pit removing station.

The crank shaft 15 is driven by a motor 15a in synchronism with movements of the chains 2.

The movable section of the pit removing unit further comprises a crosshead 19 which is rigid with and shares all movements of the sleeves 18 along the guides 17. The sleeves 18 are further rigid with arm-like carriers 20 which extend rearwardly toward the centering station 14 and are connected to each other by a second crosshead or traverse 22. Each carrier 20 has a cylindrical tube 21 intermediate the traverse 22 and the respective sleeve 18. The carriers 20 are further provided with brackets 23 which are adjacent to the respective tubes 21 and are bolted, screwed or otherwise fixedly connected to a tool holder 24. The latter carries a battery of pit removing tools 25, one for each socket 10 in that plate 6 which is located and held at a standstill at the pit removing station 13. The lower end portions 26 of the tools have milled or otherwise formed sharp cutting edges which together form a cruciform or stellate pattern and serve to penetrate into a date in the registering socket 10 of the plate 6 therebelow.

The tubes 21 surround upright columns or guides 27 secured to the frame 1 at the opposite sides of the plates 6 which advance with the upper reaches 4 of the chains 2. The columns 27 support vertically adjustable arms 29 (see also FIG. 3) each of which is disposed between two rings 28. Each of these rings is adjustably secured to the respective column 27 by a screw 28A. The arms 29 support a plate-like stripping member 30 which is adjacent to the upper side of the plate 6 at the pit removing station 13 and serves to separate the tools 25 from pitted dates when the tools are caused to move upwardly. The stripping member 30 has holes 31 which register with the tools 25. The level of the stripping member 30 is selected in such a way that the lower end portions 26 (cutting edges) of the tools 25 are located in the respective holes 31 when the sleeves 18 are held in their upper end positions.

The traverse 22 is fixedly connected with two spaced-apart sleeves 32 each of which has a partially tapped vertical axial bore 33. The internal threads of the sleeves 32 mate with external threads of two adjusting bolts 34. An L-shaped profiled bar 35 extends between the sleeves 32 and is provided with a vertical slot 36 for the shank of a screw 37 which meshes with the traverse 22. When the screw 37 is loosened, the position of the profiled bar 35 with respect to the arms 20 and tool holder 24 can be adjusted by rotating the bolts 34. As shown in FIG. 2, the lower ends of the bolts 34 abut against the horizontal portion of the profiled bar 35. When the bar 35 is properly adjusted, the bolts 34 are fixed in corresponding axial positions by lock nuts 38 and the screw 37 is tightened to hold the bar 35 in the elevated position. The bar 35 supports a plate-like holder 39 for centering elements 40 whose distribution is the same as that of the tools 25, i.e., each centering element 40 registers with a discrete socket 10 of the plate 6 at the centering station 14.

Each centering element 40 comprises a tubular portion which is mounted in the holder 39 and has a semi-cylindrical portion or extension 41 remote from the brush 11. Thus, when an extension 41 penetrates into the registering socket 10, it enters that side of the socket which is remote from the upwardly sloping reaches 5 of the chains 2, i.e. the extension 41 engage the leading ends of dates which are not fully inserted into the respective sockets 10.

The means for securing the centering elements 40 to the holder 39 comprises strip-shaped retainers 42 which are screwed or bolted to the underside of the holder 39 in a manner shown in FIG. 12.

FIGS. 2 and 4 show that the frame 1 supports two additional upright columns or guides 43 (only one of these columns is actually shown). The columns 43 are adjacent to the ends of the holder 39 and each thereof is surrounded by a reciprocable sleeve 44. The sleeves 44 are biased upwardly by helical springs 45 which react against the frame 1 and urge the upper end faces of the sleeves against ring-shaped stops 46 which are adjustably fixed to the respective columns 43 by screws 46A. The sleeves 44 have arms 47 which support a pressure plate 48. The latter has arcuate slots 49 (shown in FIG. 2) for the extensions 41 of the adjacent centering elements 40. When the holder 39 moves upwardly with the tool holder 24, the pressure plate 48 moves upwardly under the action of the springs 45 until the sleeves 44 strike against the respective stops 46. This brings the pressure plate 48 to a halt but the holder 39 for the centering elements 40 continues to move upwardly. Thus, the extensions 41 are lifted above the respective slots 49. When the holder 39 moves downwardly, the pressure plate 48 remains at a standstill until contacted by the retainers 42 which are secured to the underside of the holder 39. From there on, the pressure plate 48 moves downwardly and the sleeves 44 stress the respective springs 45. The lower end position of the pressure plate 48 is shown in FIG. 2.

In the illustrated apparatus, a plate 6 is located at the centering station 14 when the preceding plate is located at the pit removing station 13, i.e., two neighboring plates 6 are respectively located below the holders 39 and 24. As mentioned above, each socket 10 is bounded by a tulip-shaped surface and its lowermost portion constitutes a cylindrical passage 10A for the lower end portion 26 of the respective tool 25 when the corresponding plate 6 is located at the pit removing station 13. Thus, the lower end portions of the tools 25 can extend downwardly and beyond the respective sockets 10.

The tool holder 24 is reciprocable above a stationary platform 51 located below the path of those plates 6 which travel with the upper reaches 4 of the chains 2. The platform 51 has bores 52 which register with the tools 25 and contain annular inserts 53. Each insert 53 has an axial bore whose upper end portion has a reduced diameter so that it snugly receives the lower end portion 26 of the respective tool 25. This insures that the inwardly extending flange at the upper end of each insert 53 constitutes a means for cleaning the shank of the respective tool 25. At the same time, the inserts 53 allow removed pits to pass therethrough when the tools 25 perform a downward stroke.

The platform 51 is mounted above a liquid applying spray nozzle 54 which is connected with a source (not shown) of pressurized liquid, e.g., water. The connection includes a conduit 55 which contains a valve 56. Jets of liquid which issue from the orifices of the nozzle 54 are directed against the inserts 53 and the lower end portions 26 of the tools 25 when the holder 24 is moved to its lower end position (see FIG. 2).

At least one second spray nozzle 59 is mounted in the frame 1 below the lower reaches of the chains 2 (see FIG. 1) in the region below the upwardly sloping reaches 5. The nozzle 59 receives pressurized liquid (e.g., water) from a conduit 58 which contains a valve 57. The purpose of the nozzle 59 is to direct jets of a liquid against the exposed sides of the plates 6 before such plates move below the hopper 7. This insures that the surface bounding the sockets 10 are coated with liquid films before they reach the fruit-admitting station.

At least one additional spray nozzle 62 is installed in the frame 1 at a level above the lower reaches of the chains 2 to direct sprays of a pressurized liquid against the inner sides of those plates 6 which advance toward the hopper 7. The nozzle 62 is connected with a source of pressurized liquid by a conduit 61 which contains a valve 60. The valve 60 will be opened at certain intervals when the operator ascertains that the inner sides of the plates 6 must be rinsed in order to remove sugar or other deposits therefrom. As a rule, the intervals between successive openings of the valve 60 are long.

The operation:

The aforementioned prime mover drives the chains 2 in stepwise fashion so that a fresh plate 6 is moved below the holder 39 and a fresh plate 6 is moved below the holder 24 upon completion of each indexing operation. The valve 57 is opened while the chains 2 are in motion (the mechanism for automatically opening the valves 56 and 57 in response to starting and stoppage of the chains 2 is not specifically shown in the drawing). The valve 57 permits pressurized liquid to flow to the nozzle 59 so that the latter sprays liquid against the outer side of the plate 6 which approaches the hopper 7 and against the surfaces surrounding the respective sockets 10. The valve 56 admits pressurized liquid into the nozzle or nozzles 54 to insure that the interior of each insert 53 is rinsed. Furthermore, the valve 56 (which is preferably opened while the chains 2 are at a standstill and while the tools 25 are held in their lower end positions) causes the nozzle or nozzles 54 to sprinkle pressurized liquid against the internal surfaces of the inserts 53 and against the lower end portions 26 of the tools 25.

Batches of dates can be admitted into the hopper 7 while the chains 2 are in motion or during intervals between successive indexing movements of the sprocket wheels 3. Such dates descend onto the plate 6 which is located below the hopper 7 and some of them automatically enter the corresponding sockets 10 in optimum positions for removal of their pits. Certain other dates are admitted and moved in such a way that each thereof penetrates only into the upper portion of the nearest socket 10. A partially inserted date lies against the outwardly flaring upper portion of the tulip-shaped surface bounding the respective sockets 10. Certain sockets 10 of the plate 6 below the hopper 7 often remain empty. As the chains 2 are set in motion again, the plate 6 which is partially filled with dates advances toward and past the refuser 8 which removes overlapping dates and changes, to a certain extent at least, the orientation of dates which are only partially received in their sockets. Moreover, and as explained above, the refuser 8 is likely to cause at least some dates to fall into the adjacent empty sockets 10.

The plate 6 which is at least partially filled with properly and improperly (partially) inserted dates is thereupon caused to move past the brush 11 which returns into the hopper 7 all such fruits that lie on the plate 6 between neighboring sockets 10. In addition, and as also explained above, the bristles of the brush 11 cause the partially inserted dates to change their orientation so that the outwardly extending upper portions of the partially inserted dates are inclined rearwardly toward the stripping device 8, i.e., away from the station 14. It is not necessary that all partially inserted dates which advance beyond the brush 11 be exactly parallel to each other and to the direction of lengthwise movement of the chains 2. At any rate, the lower or inner portions of partially inserted dates extend into the larger-diameter outer portions of the respective sockets 10.

As the chains 2 continue to advance in stepwise fashion, the plate 6 which contains fully inserted and partially inserted (but properly oriented) dates reaches the centering station 14. The holder 39 for the centering elements 40 descends during each interval between the two successive indexing movments of the chains 2 whereby it causes the extensions 41 to penetrate into the front parts of the registering sockets 10, i.e., into those parts of the sockets which are remotest from the brush 11. This enables the extension 41 to engage the inner portions of the partially inserted dates and to change the inclination of such dates so that the dates can descend into the lower portions of the respective sockets 10. Some of the dates which are engaged and moved to upright positions by the respective extensions 41 descend by gravity. Furthermore, and since the outer surfaces of the dates are tacky, they may adhere to the respective extensions 41 and thus share the movements of extensions in a downward direction, as viewed in FIG. 2. As the holder 39 moves toward its lower end positions, its retainers 42 engage and entrain the pressure plate 48 which begins to move downwardly to complete the insertion of dates into the respective sockets 10. The pressure plate 48 contributes to proper orientation of dates by causing each date to bear at least against the central part of the surface surrounding the respective socket 10. As a rule, the dates will or are likely to undergo at least some deformation in response to downward movement of the pressure plate 48.

The holder 39 thereupon moves upwardly to retract the extensions 41 of the centering elements 40 from the registering sockets 10. The dates do not share such upward movement of the extensions 41 even though the pressure plate 48 leaves its lower end position during the initial stage of upward movement of the holder 39 because the dates bear against the surfaces surrounding the respective sockets 10. The pressure plate 48 comes to a standstill when the sleeves 44 reach and are arrested by the respective ring-shaped stops 46 on the column 43. The holder 39 continues to move upwardly so that the extensions 41 slide with respect to the surfaces bounding the respective slots 49 in the arrested pressure plate 48. This insures that any dates which adhere to the extensions 41 are separated from the centering elements 40 and descend into the sockets 10 therebelow. Owing to the provision of the aforementioned nozzle 59 which coats the outer sides of the plates 6 with liquid films (such liquid films also coat the surfaces surrounding the sockets 10), the tendency of dates to strongly adhere to the surfaces surrounding the respective sockets is negligible or not very pronounced.

When the holder 39 reassumes its upper end position, the chains 2 are advanced again to move the pressure plate 6 from the centering station 14 to the pit removing station 13. The holder 24 descends when the chains 2 are arrested whereby the tools 25 penetrate through the holes of the stripping member 30 and their lower end portions 26 move axially through the dates in the respective sockets 10. The descending end portions 26 encouter the pits and push them downwardly through and beyond the corresponding inserts 53 in the platform 51. When the end portions 26 of the tools 25 reach their lower end positions, they are sprayed with liquid which issues from the orifices of the nozzle 54. The holder 24 thereupon moves upwardly whereby the dates which share the upward movements of the respective tools 25 encounter and are arrested by the stripping member 30. The liquid films which are applied by the nozzle 54 reduce friction between the pitted dates and the lower end portions 26 of the ascending tools 25. Moreover, such liquid films reduce the likelihood of accumulation of concentrated sugar on external surfaces of the tools 25. Consequently, the underside of the stripping member 30 also remains clean because the amounts of sugar which deposit thereon during upward movement of the tools 25 are negligible. In other words, the external surfaces of the tools 25 remain clean for long periods of time so that the apparatus can be used, without cleaning the tools 25, during several consecutive shifts.

The expelled pits descend into a collecting trough (not shown) or into a conveyor or chute to be transported to disposing station or to another destination. If the pits descend into a trough, the latter is preferably provided with a rotating feed screw or the like to insure continuous or intermittent evacuation of accumulated pits.

The plate 6 with pitted dates in its sockets thereupon advances toward and around the left-hand end turns of the chains 2 (as viewed in FIG. 1) share the dates to leave the sockets by gravity and enter a collecting receptacle 70. If desired, the expulsion of pitted dates from their sockets 10 can be assisted or caused by suitable ejector pins (not shown) which penetrate into the sockets 10 from the inner sides of adjacent plates 6 during intervals between successive intermittent advances of the chains 2. The expulsion by gravity and/or by resorting to ejector pins presents no problems because the liquid-coated surfaces surrounding the sockets 10 prevent strong adherence of pitted dates to the plates 6. Moreover, the liquid films which are applied by the nozzle 59 reduce the likelihood of accumulation of pronounced layers of sugar along the surfaces surrounding the sockets 10 so that the apparatus need not be provided with additional means for rinsing the sockets 10. The application of liquid films to the surfaces bounding the sockets 10 is repeated, for each and every plate 6, before such plate returns to the station below the hopper 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In an apparatus for pitting elongated drupaceous fruits of the type having first and second end portions, especially dates, the combination of a series of supporting elements having elongated sockets for reception of fruits; means for transporting said elements seriatim in a predetermined direction and along a predetermined path to a first station where the fruits are admitted into at least some of the sockets in successive supporting elements of said series so that one end portion of each admitted fruit extends into the respective socket whereby some of the admitted fruits are normally received in the respective sockets to a lesser first extent and the remaining admitted fruits are received in the respective sockets to a greater second extent, thereupon to a second station and then to a third station; means for orienting at least those fruits which extend into the respective sockets to said lesser first extent so that the other portion of each such fruit extends substantially counter to said direction, said orienting means being located between said first and second stations; means for centering at said second station those fruits which are received in the respective sockets of the supporting element to said first extent so that the centered fruits are free to penetrate deeper into the respective sockets; and means for removing pits from fruits in the sockets of the supporting element at said third station.

2. The combination of claim 1, wherein said removing means comprises a plurality of tools, one for each socket of a supporting element and each in register with a different socket of the supporting element at said third station, and means for moving said tools into, through and partly beyond the sockets of the supporting element at said third station, said tools having end portions which penetrate through and expel pits from fruits in the respective sockets during movement of said tools through the sockets at said third station, and further comprising means for applying liquid films to the end portions of said tools while said tools extend partly beyond the respective sockets.

3. The combination of claim 2, wherein said tools are normally located above that portion of said path which extends through said third station and said liquid applying means comprises a spray nozzle located below said portion of said path.

4. The combination of claim 1, further comprising means for applying liquid films to the surfaces surrounding the sockets of successive supporting elements ahead of said first station.

5. The combination of claim 1, wherein each of said supporting elements has a first side and a second side, and further comprising means for applying liquid films to the first and second sides of successive supporting elements.

6. The combination of claim 5, wherein said liquid applying means comprises at least one first spray nozzle adjacent to one side of said path and at least one second spray nozzle adjacent to the other side of said path.

7. The combination of claim 1, wherein said orienting means comprises a rotary brush having bristles arranged to incline counter to said direction at least those fruits which are received in the respective sockets to said lesser first extent.

8. The combination of claim 1, wherein said centering means comprises a plurality of centering elements, one for each socket of a supporting element, and means for moving said centering elements into and from the sockets of the supporting element at said second station, said centering elements having fruit-engaging portions arranged to extend into those portions of sockets in the supporting element at said second station which are remote from said orienting means to engage said other end portion of each fruit which is received in the respective socket to said lesser first extent.

9. The combination of claim 1, further comprising a magazine disposed at said first station and arranged to discharge fruits onto successive supporting elements of said series, said orienting means including a rotary brush adjacent to said path intermediate said first and second stations and arranged to incline counter to said direction at least those fruits which are received in the respective supporting elements to said lesser first extent, and further comprising an adjustable refuser for overlapping fruits on successive supporting elements, said refuser extending substantially transversely of said path intermediate said brush and said first station.

10. The combination of claim 9, further comprising means for maintaining said refuser in any one of a plurality of positions in each of which said refuser is located at a different distance from the supporting element in the adjacent portion of said path.

* * * * *